(12) United States Patent
Mach et al.

(10) Patent No.: US 10,648,900 B2
(45) Date of Patent: May 12, 2020

(54) MULTI-COLOR FLOW CYTOMETRIC ANALYSIS OF SAMPLES WITH LOW CELL NUMBERS

(71) Applicant: Becton, Dickinson and Company, Franklin Lakes, NJ (US)

(72) Inventors: Albert Mach, San Jose, CA (US); Smita Ghanekar, Fremont, CA (US); Marja Suni, Los Gatos, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 56 days.

(21) Appl. No.: 15/371,088

(22) Filed: Dec. 6, 2016

(65) Prior Publication Data

US 2017/0184486 A1 Jun. 29, 2017

Related U.S. Application Data

(60) Provisional application No. 62/387,434, filed on Dec. 23, 2015.

(51) Int. Cl.
*G01N 15/14* (2006.01)
*G01N 15/10* (2006.01)
*G01N 15/00* (2006.01)

(52) U.S. Cl.
CPC ..... *G01N 15/1463* (2013.01); *G01N 15/1404* (2013.01); *G01N 15/1425* (2013.01); *G01N 2015/0065* (2013.01); *G01N 2015/1006* (2013.01); *G01N 2015/142* (2013.01); *G01N 2015/1486* (2013.01)

(58) Field of Classification Search
CPC ........... G01N 15/1463; G01N 15/1404; G01N 15/1425; G01N 15/1409; G01N 15/1411; G01N 2015/0065; G01N 2015/1006; G01N 2015/1486; G01N 2015/142
See application file for complete search history.

(56) References Cited

U.S. PATENT DOCUMENTS

| | | | | |
|---|---|---|---|---|
| 9,488,621 | B2 * | 11/2016 | Kaduchak | G01N 15/1404 |
| 2011/0134426 | A1 * | 6/2011 | Kaduchak | G01N 15/1404 356/337 |
| 2014/0120570 | A1 * | 5/2014 | Yu | B03C 1/288 435/29 |
| 2015/0017678 | A1 * | 1/2015 | Matula | G01N 1/4077 435/30 |
| 2015/0185184 | A1 * | 7/2015 | Guia | G01N 1/34 204/543 |

OTHER PUBLICATIONS

Piyasena et al. Multinode acoustic focusing for parallel flow cytometry. Anal. Chem. 84 (4): 1831-1839 (Feb. 21, 2012).*

* cited by examiner

*Primary Examiner* — Gailene Gabel
(74) *Attorney, Agent, or Firm* — Kathleen Y. Rao; Bret E. Field; Bozicevic, Field & Francis LLP

(57) ABSTRACT

Aspects of the present disclosure include methods for processing a biological sample. Methods according to certain embodiments include contacting a biological sample having cells with an assay reagent that includes one or more analyte-specific binding members to produce a biological sample assay composition and introducing the biological assay composition into an inlet of a flow cytometer having an integrated acoustic separator. Systems, including a flow cytometer with integrated acoustic separator having one or more acoustic concentrator devices suitable for practicing the subject methods are also described.

23 Claims, 5 Drawing Sheets

B) 
FIG. 2 (CON'T)

MULTI-COLOR FLOW CYTOMETRIC ANALYSIS OF SAMPLES WITH LOW CELL NUMBERS

CROSS REFERENCE TO RELATED APPLICATION

Pursuant to 35 U.S.C. § 119(e), this application claims priority to the filing date of U.S. Provisional Patent Application No. 62/387,434, filed Dec. 23, 2015; the disclosure of which application is herein incorporated by reference.

INTRODUCTION

The characterization of analytes in biological fluids has become an integral part of medical diagnoses and assessments of overall health and wellness of a patient. In particular, analyte detection in physiological fluids, e.g., blood or blood derived products is of ever increasing importance where the results may play a prominent role in the treatment protocol of a patient in a variety of disease conditions. As an analytical tool, flow cytometry is increasingly being used in disease diagnosis, such as for cancer and for monitoring disease conditions, such as prenatal and neonatal immunological abnormalities.

Processing a biological sample often requires laborious purification and separation protocols. This generally entails a manual step involving centrifugation, which may be time consuming, damage the cells, or lead to aggregation of the cells in the sample. Cells used in flow cytometry often must also be washed and concentrated prior to analysis. Likewise, long periods of purification or enzymatic treatment of biological samples can be deleterious to the biological sample, with losses of cell viability to over-processing.

SUMMARY

Aspects of the present disclosure include methods for processing and analyzing a biological sample. Methods according to certain embodiments include contacting a biological sample having cells with an assay reagent that includes one or more analyte-specific binding members to produce a biological sample assay composition and introducing the biological sample assay composition into an inlet of a flow cytometer having an integrated acoustic separator. In embodiments, the acoustic separator includes a flow channel having an inlet and an outlet and an acoustic field generator positioned adjacent to the flow channel and configured to produce an acoustic field in the flow channel. Systems, including flow cytometers with integrated acoustic separator having one or more acoustic concentrator devices suitable for practicing the subject methods are also described.

BRIEF DESCRIPTION OF THE DRAWINGS

The invention may be best understood from the following detailed description when read in conjunction with the accompanying drawings. Included in the drawings are the following figures:

FIG. 2A depicts a graphical representation of a flow cytometer sampling system configured for receiving and processing a biological sample assay composition. FIG. 2B depicts a photograph of a flow cytometer sampling system for processing a biological sample assay composition.

FIG. 4, panel A depicts a graph of cell recovery of biological samples having low cell numbers. FIG. 4, panel B depicts a two dimensional plot comparing a biological sample assay composition analyzed by a conventional flow cytometer and the same biological sample assay composition with a flow cytometer as provided by the present disclosure according to certain embodiments. FIG. 4, panel C illustrates the analysis of a biological sample assay composition by flow cytometry with the subject systems (panel 2) as compared to analysis by flow cytometry without processing the biological sample assay composition (panel 1) and as compared to analysis by flow cytometry after traditional wash and centrifugation methods (panel 3).

DETAILED DESCRIPTION

Figure 1:
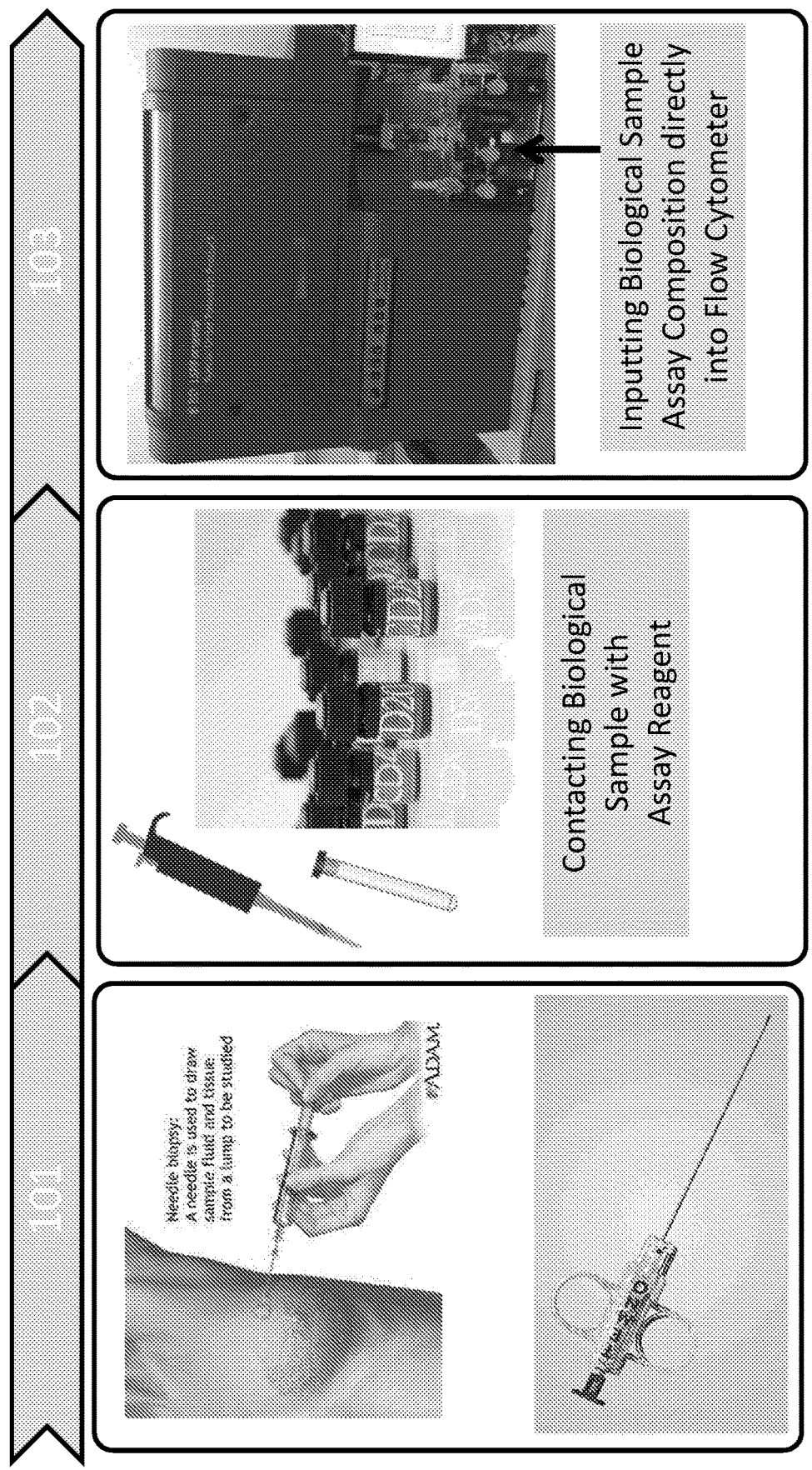
FIG. 1 illustrates an example workflow for processing and analyzing an biological sample according to certain embodiments.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As reviewed above, the present disclosure provides methods and systems for processing and analyzing a biological sample. In further describing embodiments of the disclosure, methods for processing and analyzing a biological sample are first described in greater detail. Next, systems suitable for practicing the subject methods are described. Computer controlled systems and kits are also provided.

Methods for Processing and Analyzing a Biological Sample

As summarized above, aspects of the present disclosure include methods for processing and analyzing a biological sample having cells. The term "biological sample" is used herein in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysates, lavages or extracts prepared from the organism or a subset of its tissues, including but not limited to, for example, plasma, serum, spinal fluid, lymph fluid, sections of the skin, respiratory (e.g., bronchial), gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.) For example, the biological sample may be a tissue biopsy, pediatric sample, bronchial lavage, pleural lavage, nasal lavage or a fine needle aspirate In embodiments, the biological sample contains cells. Suitable cells include eukaryotic cells (e.g., mammalian cells) and/or prokaryotic cells (e.g., bacterial cells or archaeal cells). Samples may be obtained from an in vitro source (e.g., a suspension of cells from laboratory cells grown in culture) or from an in vivo source (e.g., a mammalian subject, a human subject, etc.). In some embodiments, the cellular sample is obtained from an in vitro source. In vitro sources include, but are not limited to, prokaryotic (e.g., bacterial, archaeal) cell cultures, environmental samples that contain prokaryotic and/or eukaryotic (e.g., mammalian, protest, fungal, etc.) cells, eukaryotic cell cultures (e.g., cultures of established cell lines, cultures of known or purchased cell lines, cultures of immortalized cell lines, cultures of primary cells, cultures of laboratory yeast, etc.), tissue cultures, and the like.

In some embodiments, the sample is obtained from an in vivo source and can include samples obtained from tissues (e.g., cell suspension from a tissue biopsy, cell suspension from a tissue sample, etc.) and/or body fluids (e.g., whole blood, fractionated blood, plasma, serum, saliva, lymphatic fluid, interstitial fluid, etc.). In some cases, cells, fluids, or tissues derived from a subject are cultured, stored, or manipulated prior to evaluation. In vivo sources include living multi-cellular organisms and can yield non-diagnostic or diagnostic cellular samples.

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

As summarized above, methods include processing and analyzing a biological sample having cells. In some embodiments, the subject methods include isolating target cells of interest from the other components of the biological sample. For example, target cells may be separated from other types of undesired cells, separated from cellular debris (e.g., cell fragments, fragmented cell membranes, organelles, dead or lysed cells) as well as separated from non-cellular macromolecules such as connective tissue, free lipids, proteins and nucleic acid fragments. Isolating target cells from a biological sample may also include breaking up agglomerated cells or cell aggregates. In certain embodiments, methods include breaking up an organ, tissue or tissue fragment in order to collect the cells which collectively make up the organ, tissue or tissue fragment.

Biological samples of interest may exhibit a wide range of viscosities, such as ranging from 0.01 cP to 750 cP, including 0.1 cP to 100 cP, such as 0.1 cP to 50 cP, 0.2 cP to 10 cP, 0.2 cP to 2.0 cP, 0.5 to 1.5 cP, or 0.75 cP to 1.5 cP. In certain embodiments, the biological sample is a fluidic sample having viscosity substantially equal to that of water at the given temperature (e.g., 1 cP at 20° C., 0.65 cP at 40° C.). In some instances, the subject methods provide biological samples having a collection of cells that exhibit low entrainment. Entrainment is a measure of the degree of aggregation of components (e.g. cells) in a liquid sample, defined as the ratio of the observed distribution of the component over the expected distribution based on a normal Poisson distribution, e.g., as described in Lindmo, et al. (1981) Cytometry, 2, 151-154, the disclosure of which is herein incorporated by reference. In certain aspects, the subject methods produce biological sample assay compositions with an entrainment factor of 2.0 to 0.0, such as about 1.5 to 0.0, including 1.0 to 0.0, 0.75 to 0.0, about 0.5 to 0.0, 0.4 to 0.02, or 0.25 to 0.0.

In embodiments, the volume of biological sample processed and analyzed by subject methods may vary, for example, ranging from 0.01 µL to 10000 µL, such as from 0.05 µL to 9000 µL, such as from 0.1 µL to 8000 µL, such as from 0.5 µL to 7000 µL, such as from 1 µL to 6000 µL, such as from 2.5 µL to 5000 µL, such as from 5 µL to 4000 µL, such as from 7.5 µL to 3000 µL, such as from 10 µL to 2000 µL of sample, such as from 50 µL to 1500 µL and including from 100 µL to 1000 µL. In certain embodiments, the biological sample is a fine needle aspirate. The term "fine needle aspirate" is used herein in its conventional sense to refer to a biological sample taken up with a syringe (or other suction device) from a biological source through a needle and includes cells from solid or liquid components of the aspirate. The volume of fine needle aspirates may vary, depending on the tissue aspirated, size of the needle, collection reservoir and desired cell count, and may be 5 µL or more, such as 10 µL or more, such as 15 µL or more, such as 25 µL or more, such as 50 µL or more, such as 100 µL or more, such as 250 µL or more, such as 500 µL or more and including 1000 µL or more. In certain embodiments, the volume of the fine needle aspirate collected in methods of the present disclosure is 500 µL or less, such as 400 µL or less, such as 300 µL or less, such as 200 µL or less, such as 100 µL or less and including 50 µL or less. For example, the volume of fine needle aspirate collected may range from 5 µL to 1000 µL, such as from 10 µL to 900 µL, such as from 25 µL to 750 µL, such as from 50 µL to 500 µL and including from 100 µL to 400 µL.

In embodiments, the biological sample contains cells. In certain instances, the biological sample is a specimen that contains a low quantity of cells. For example, the biological sample may be a specimen having 25,000 cells or less, such as 20,000 cells or less, such as 15,000 cells or less, such as 10,000 cells or less, such as 5000 cells or less, such as 2500 cells or less, such as 1000 cells or less and including 500 cells or less. For example, the biological sample may be a tissue biopsy, pediatric sample, bronchial lavage, pleural lavage, nasal lavage or a fine needle aspirate having 10,000 cells or less, such as 5000 cells or less, such as 1000 cells or less and including 500 cells or less. Depending on the volume of the biological sample, as described above, the concentration of cells in the biological sample may vary and may be 25,000 cells/µL or less, such as 20,000 cells/µL or less, such as 15,000 cells/µL or less, such as 10,000 cells/µL or less, such as 5000 cells/µL or less, such as 2500 cells/µL or less, such as 1000 cells/µL or less and including a concentration of 500 cells/µL or less. For example, the biological sample may be a tissue biopsy, pediatric sample, bronchial lavage, pleural lavage, nasal lavage or a fine needle aspirate having 10,000 cells/µL or less, such as 5000 cells/µL or less, such as 2500 cells/µL or less, such as 1000 cells/µL or less and including a concentration of 500 cells/µL or less.

In certain embodiments, the biological sample is a specimen that has been preloaded into a container (e.g., syringe, vortex microtube, sonicator vessel, etc.) containing an assay reagent having one or more analyte-specific binding members and is stored in the container for a predetermined period of time before the biological sample assay composition is introduced into an inlet of the flow cytometer having an integrated acoustic separator. The amount of time the biological sample assay composition that is stored in the container with the assay reagent may vary, such as 0.1 hours or more, such as 0.5 hours or more, such as 1 hour or more, such as 2 hours or more, such as 4 hours or more, such as 8 hours or more, such as 16 hours or more, such as 24 hours or more, such as 48 hours or more, such as 72 hours or more, such as 96 hours or more, such as 120 hours or more, such as 144 hours or more, such as 168 hours or more and including preloading the biological sample into the container with assay reagent 240 hours or more before introducing the biological sample assay composition into the flow cytometer or may range such as from 0.1 hours to 240 hours before introducing the biological sample assay composition into the flow cytometer, such as from 0.5 hours to 216 hours, such as from 1 hour to 192 hours and including from 5 hours to 168 hours before introducing the biological sample assay composition into the flow cytometer. For example, the biological sample may be preloaded into a container having assay reagent at a remote location (e.g., at home using an at-home kit or in a physician's office) and sent to a laboratory for processing in accordance with the subject methods. By "remote location" is meant a location other than the location at which the biological sample is contained and preloaded into the container. For example, a remote location could be another location (e.g. office, lab, etc.) in the same city, another location in a different city, another location in a different state, another location in a different country, etc., relative to the location of the flow cytometer having integrated acoustic separator, e.g., as described in greater detail below. In some instances, two locations are remote from one another if they are separated from each other by a distance of 10 m or more, such as 50 m or more, including 100 m or more, e.g., 500 m or more, 1000 m or more, 10,000 m or more, up to, in some instances, 100,000 m, etc.

In practicing methods according to certain embodiments, the biological sample (e.g., fine needle aspirate) having cells is contacted with an assay reagent that includes one or more analyte-specific binding members to produce a biological sample assay composition. Any convenient mixing protocol may be employed when contacting the biological sample with the assay reagent. Mixing, in certain embodiments, may include stirring the mixture with a magnetic stir bar or manually stirring the mixture (e.g., with a stirring rod) as well as vortexing or agitating the mixture either manually (i.e., by hand) or mechanically (i.e., by a mechanically or electrically powered shaking device). The biological sample and assay reagent may also be mixed by drawing the mixture into a syringe and re-injecting the solution into a container. In embodiments, mixing the biological sample with the assay reagent is sufficient to couple one or more components of the biological sample (e.g., target cells) with an analyte-specific binding member. By "coupling" is meant that the target component of the biological sample and analyte-specific binding member forms one or more physical or chemical bonds to each other, including but not limited to coupling by ionic, dipolar, hydrophobic, coordinative, covalent, van der Waals or hydrogen bonding interactions to couple the target component in the biological sample with the analyte-specific binding member. In some instances, coupling the target component in the biological sample to an analyte-specific binding member includes covalently bonding the sample component to the analyte-specific binding member. In certain instances, coupling the sample component to an analyte-specific binding member includes non-covalently bonding (e.g., through hydrogen bonding) the sample component to the analyte-specific binding member. For example coupling between the analyte-specific binding member and the target analyte may be characterized by a dissociation constant, such as dissociation constant of $10^{-5}$ M or less, $10^{-6}$ M or less, such as $10^{-7}$ M or less, including $10^{-8}$ M or less, e.g., $10^{-9}$ M or less, $10^{-10}$ M or less, $10^{-11}$ M or less, $10^{-12}$ M or less, $10^{-13}$ M or less, $10^{-14}$ M or less, $10^{-15}$ M or less and including $10^{-16}$ M or less.

The biological sample is contacted with the assay reagent for a duration sufficient to couple one or more components of the biological sample with one or more analyte specific binding members, such as for 1 minute or longer, such as for 5 minutes or longer, such as for 10 minutes or longer and including for 30 minutes or longer. As discussed above, in certain embodiments the biological sample is contacted with the assay reagent and the prepared biological sample assay composition is stored for an extended period of time until being introduced into the flow cytometer.

The assay reagent may include one or more analyte-specific binding members, including but not limited to antibody binding agents, proteins, peptides, haptens, nucleic acids, oligonucleotides. The assay reagent, in certain embodiments, is a dry assay reagent. By "dry" is meant that the subject assay reagents contain little to no liquid component (e.g., water). For example, assay reagents of interest include formulations having a liquid component (e.g., water) that is 1% w/w or less, such as 0.5% w/w or less, such as 0.25% w/w or less, such as 0.1% w/w or less, such as 0.05% w/w or less, such as 0.01% w/w or less and including 0.001% w/w or less. In certain embodiments, where the assay reagent is a dried composition, methods may include rehydrating the assay reagent with one or more fluids, such as with a buffer solution before contacting the biological sample with the assay reagent. In other embodiments, contacting the biological sample with the dry assay reagent is sufficient to rehydrate the assay reagent.

Analyte-specific binding members coupled to components of the biological sample may vary depending on the sample being assayed and the target analytes of interest and may include, but are not limited to antibody binding agents, proteins, peptides, haptens, nucleic acids, oligonucleotides. In some embodiments, the analyte-specific binding member is an enzyme. Examples of analyte-specific binding enzymes may be horseradish peroxidase, pyruvate oxidase, oxaloacetate decarboxylase, creatinine amidohydrolase, creatine amidinohydrolase, sarcosine oxidase, malate dehydrogenase, lactate dehydrogenase, FAD, TPP, P-5-P, NADH, amplex red and combinations thereof. In other embodiments, the analyte-specific binding member is an antibody binding agent. The antibody binding agent can be, for example, a polyclonal or monoclonal antibody or a fragment sufficient to bind to the analyte of interest. The antibody fragments can be in some instances monomeric Fab fragments, monomeric Fab' fragments, or dimeric F(ab)'2 fragments. Also within the scope of the term "antibody binding agent" are molecules produced by antibody engineering, such as single-chain antibody molecules (scFv) or humanized or chimeric antibodies produced from monoclonal antibodies by replacement of the constant regions of the heavy and light chains to produce chimeric antibodies or replacement of both the constant regions and the framework portions of the variable regions to produce humanized antibodies. In certain embodiments, one or more components of the sample are coupled to an antibody or antibody fragment that binds specifically to a compound such as CD14, CD4, CD45RA and CD3 or a combination thereof.

In embodiments, the analyte-specific binding agent may be coupled to a detectable label, such as radioactive labels, labels detectable by spectroscopy techniques such as nuclear magnetic resonance as well as optically detectable labels. In some embodiments, contacting the biological sample with the assay reagent includes coupling one or more components of the sample to an analyte-specific binding member conjugated to an optically detectable label. In certain instances, the optically detectable label is detectable by emission spectroscopy, such as by fluorescence spectroscopy. In these instances, the optically detectable label is a fluorophore such as 4-acetamido-4'-isothiocyanatostilbene-2,2'disulfonic acid; acridine and derivatives such as acridine, acridine orange, acridine yellow, acridine red, and acridine isothiocyanate; 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy5, Cy5.5, and Cy7; 4',6-diaminidino-2-phenylindole (DAPI); 5',5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144; IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene or combinations thereof, among other fluorophores. In certain embodiments, the fluorophore is a fluorescent dye such as rhodamine, coumarin, cyanine, xanthene, polymethine, pyrene, dipyrromethene borondifluoride, napthalimide, phycobiliprotein, peridinium chlorophyll proteins, conjugates thereof or a combination thereof.

Contacting the biological sample with the assay reagent can be carried out at any suitable temperature so long as the viability of the target cells collected is preserved as desired. As such, the temperature for contacting the biological sample with the assay reagent may vary, such as from −80° C. to 100° C., such as from −75° C. to 75° C., such as from −50° C. to 50° C., such as from −25° C. to 25° C., such as from −10° C. to 10° C., and including from 0° C. to 25° C.

As described above, a biological sample is contacted with an assay reagent to produce a biological sample assay composition. Methods of the present disclosure also include introducing the biological sample assay composition into an inlet of a flow cytometer having an integrated acoustic separator. In embodiments, the biological sample assay composition is introduced directly into the flow cytometer inlet in the absence of any washing or centrifugation. In other words, the crude biological sample assay composition, composed of biological sample mixed with assay reagent, is taken directly from the container used to contact the biological sample with the assay reagent and inputted into the subject flow cytometers without any intervening steps to wash or otherwise purify the sample.

Depending on the volume of the biological sample and assay reagent, all or part of the biological sample assay composition may be introduced into the flow cytometer. In some embodiments, 50% or more of the biological sample assay composition is introduced into the flow cytometer, such as 60% or more, such as 70% or more, such as 80% or more, such as 90% or more, such as 95% or more and including introducing 99% or more of the biological sample assay composition into the flow cytometer.

In embodiments of the present disclosure, substantially all of the target cells of the biological sample contacted with the assay reagent are introduced into the flow cytometer. In other words, processing the biological sample in accordance with embodiments of the present disclosure provides for little to no loss of target cells of biological samples (e.g., left behind in washed assay reagent, degraded, lysed, or otherwise rendered non-viable, etc.) before introduction into the inlet of the flow cytometer. For example, in some embodiments, 10% or less of the target cells of the biological sample are lost before introduction into the inlet of the flow cytometer, such as 5% or less, such as 3% or less, such as 2% or less, such as 1% or less, such as 0.5% or less, such as 0.1% or less, such as 0.01% or less and including 0.001% or less of the target cells of the biological sample are lost before introduction into the inlet of the flow cytometer. Put another way, 90% or more of the target cells of the biological sample assay composition are introduced into the flow cytometer, such as 95% or more, such as 96% or more, such as 97% or more, such as 98% or more, such as 99% or more and including 99.999% of the target cells of the biological sample assay composition are introduced into the flow cytometer. In certain embodiments, the entire (i.e., 100%) biological sample assay composition is introduced into the flow cytometer.

The biological sample assay composition may be introduced into the inlet of the flow cytometer by any convenient protocol. In some embodiments, methods include injecting the biological sample assay composition using a syringe with an attached needle or by connecting the inlet of the flow cytometer with a conduit in fluid communication with a source of the biological sample assay composition, such as the container (e.g., syringe) used to contact the biological sample with the assay reagent.

As described in the greater detail below, the flow cytometer includes an integrated acoustic separator in fluid communication with the flow cytometer inlet. The integrated acoustic separator includes a flow channel with an inlet and outlet and an acoustic field generator positioned adjacent to the flow channel and configured to produce an acoustic field in the flow channel. In embodiments, the acoustic separator integrated into the flow cytometer is configured to receive the biological sample assay composition directly from the container used to contact the biological sample with the assay reagent and to acoustically separate larger components from smaller components in the biological sample assay composition. The term "acoustically separating" is used herein in its conventional sense broadly and generically to refer to a process in which particulate matter (e.g., cells, cellular debris, tissue matter and non-cellular compounds) in a biological sample may be controlled or manipulated by application of an ultrasonic standing wave. Accordingly, in certain instances methods include acoustically sorting components of the biological sample assay composition, such as separating cells conjugated to one or more analyte-binding members from cellular debris, tissue matter and other non-cellular components. In other instances, methods include acoustically concentrating components of the biological sample assay composition, such as concentrating cells conjugated to one or more analyte-binding members from cells not conjugated to an analyte-binding member. In yet other instances, methods include acoustically washing the biological sample assay composition, such as removing analyte-binding members or staining reagents not bound to cells of the biological sample.

As summarized above, methods include washing a biological sample assay composition to separate cells conjugated to an analyte-binding moiety from other components in the compositions, including excess assay reagent, stains, tissue, tissue fragments, cell aggregates as well as cellular debris and non-cellular macromolecules. Methods for acoustic separation as well as devices of interest that are incorporated into and in fluid communication with the inlet of the flow cytometer may include, but are not limited to, those described in U.S. Pat. Nos. 8,956,536 and 6,929,750 and United States Patent Application Publication No. 20150177111, the disclosures of which are herein incorporated by reference; as well as those described in Laurell, et al. (2007) Chem. Soc. Rev., 2007, 36, 492-506; Petersson, et al. (2005) Analytical Chemistry 77: 1216-1221; and Augustsson, et al. (2009) Lab on a Chip 9: 810-818. Briefly, an acoustic contrast factor ($\phi$-factor) depends on both a particle's (e.g., cell or group of cells conjugated to one or more analyte-binding members) density ($\rho_c$) and its compressibility ($\beta_c$) in relation to the corresponding properties of the surrounding medium ($\rho_w$, $\beta_w$). An acoustic contrast factor may be positive or negative, which determines the direction of the acoustic force and whether a particular particle will move towards a standing pressure wave node or towards the pressure antinode.

In certain aspects, acoustically separating components of the biological sample assay composition follows the Lund-method, where compounds in the biological sample assay composition of different sizes are acoustically separated in a laminar flow microchannel ultrasonically actuated using an acoustic field generator (e.g., a piezoelectric ceramic). In certain embodiments, the width of the channel corresponds to half the desired ultrasonic wavelength, creating a resonator between the side walls of the flow channel in which a standing wave can be formed. In these embodiments, the induced standing wave is generated orthogonal to the incident ultrasonic wave front. Larger components of the biological sample assay composition with a positive $\phi$-factor are moved during flow through the channel, by means of the axial primary radiation force (PRF), towards the pressure nodal plane along the channel center, while smaller components of the biological sample assay composition remain close to the side walls.

In some embodiments, fluidic flow through the acoustic separator in the flow cytometer is laminar. The term "laminar flow" is used in its conventional sense to refer to the flow dynamic where fluid flows in a plurality of parallel layers which little to no disruption between the layers. For instance, a stream of sheath buffer may be laminated between two streams of sample in the flow through the acoustic separator of the flow cytometer. In these embodiments, when an acoustic field is applied, particles of higher density (e.g., tissue, cell aggregates, etc.) are forced to a node of the acoustic standing wave in a laminate of flowing wash buffer.

Separation of the larger components from the smaller components is, in certain instances, completed by a split channel outlet configured to provide the separated larger components through a center outlet and the smaller components through one or more side outlets. In embodiments where target cells conjugated to one or more analyte binding members are larger components and cellular debris such as free macromolecules (protein, polysaccharides, etc.) and non-target cells are smaller components of the biological assay composition, the separated target cells conjugated to analyte binding members may be collected into a sample collection reservoir through the center outlet and the smaller components may be directed to a waste reservoir through one or more side outlets. In other embodiments, where target cells conjugated to one or more analyte binding members are smaller components and tissue fragments and cell aggregates are larger components of the biological assay composition, the separated target cells conjugated to analyte binding members may be collected into a sample collection reservoir through one or more side outlets and the larger components may be directed to a waste reservoir through a center outlet.

In some embodiments, the acoustic standing wave is focused to the center of the flow channel. In these embodiments, the acoustic standing wave is configured to propagate within the channel applying an acoustic radiation pressure within the flow channel. In certain instances, the applied acoustic standing wave does not propagate outside of the flow channel. In certain embodiments, the acoustic field is applied only in a single direction by the vibration transducer. As such, in these embodiments the vibration transducer does not simultaneously apply acoustic fields in two or more different directions.

The biological sample assay composition is conveyed through the inlet of the flow cytometer and into the acoustic separator. In certain embodiments, during separation the biological sample assay composition is carried through the flow channel of the acoustic separator along the sides of a conduit and a laminating wash buffer is flowed between. The laminating wash buffer may be any suitable wash buffer, such as a buffer that is suitable for washing excess assay reagent in the biological sample assay composition. Buffers of interest may contain, but are not limited to, proteins, polysaccharides, salts, chemical binders and combinations thereof. Encompassed by the invention are both fluidic and dry buffers reconstituted with a solvent, e.g., water.

In some embodiments, buffers include polysaccharides, such as from example glucose, sucrose, fructose, galactose, mannitol, sorbitol, xylitol, among other polysaccharides. In some instances, buffers include a protein such as BSA. In yet other instances, buffers of interest in a chemical binder, including but not limited to low molecular weight dextrans, cyclodextrin, polyethylene glycol, polyethylene glycol ester polyvinylpyrollidone (PVP) or other hydrophilic polymers selected from the group consisting of hyaluronic acid, polyvinylpyrollidone (PVP), copolymers of N-vinylpyrollidone, hydroxyethyl cellulose, methyl cellulose, carboxymethyl cellulose, dextran, polyethyleneglycol (PEG), PEG/PPG block copolymers, homo- and copolymers of acrylic and methacrylic acid, polyurethanes, polyvinyl alcohol, polyvinylethers, maleic anhydride based copolymers, polyesters, vinylamines, polyethyleneimines, polyethyleneoxides, poly(carboxylic acids), polyamides, polyanhydrides, polyphosphazenes, and mixtures thereof.

In certain embodiments, buffers of interest include a biological buffer, including but not limited to N-(2-acetamido)-aminoethanesulfonic acid (ACES), acetate, N-(2-acetamido)-iminodiacetic acid (ADA), 2-aminoethanesulfonic acid (AES), ammonia, 2-amino-2-methyl-1-propanol (AMP), 2-amino-2-methyl-1,3-propanediol (AMPD), N-(1,1-dimethyl-2-hydroxyethyl)-3-amino-2-hydroxypropanesulfonic acid (AMPSO), N,N-bis-(2-hydroxyethyl)-2-aminoethanesulfonic acid (BES), bicarbonate, N,N'-bis-(2-hydroxyethyl)-glycine, [Bis-(2-hydroxyethyl)-imino]-tris-(hydroxymethylmethane) (BIS-Tris), 1,3-Bis[tris(hydroxymethyl)-methylamino]propane (BIS-Tris-propane), boric acid, dimethylarsinic acid, bovine serum albumin (BSA) 3-(Cyclohexylamino)-propanesulfonic acid (CAPS), 3-(cyclohexylamino)-2-hydroxy-1-propanesulfonic acid (CAPSO), carbonate, cyclohexylaminoethanesulfonic acid (CHES), citrate, 3-[N-Bis(hydroxyethyl)amino]-2-hydroxypropanesulfonic acid (DIPSO), formate, glycine, glycylglycine, N-(2-Hydroxyethyl)-piperazine-N'-ethanesulfonic acid (HEPES), N-(2-Hydroxyethyl)-piperazine-N'-3-propanesulfonic acid (HEPPS, EPPS), N-(2-Hydroxyethyl)-piperazine-N'-2-hydroxypropanesulfonic acid (HEPPSO), imidazole, malate, maleate, 2-(N-Morpholino)-ethanesulfonic acid (MES), 3-(N-Morpholino)-propanesulfonic acid (MOPS), 3-(N-Morpholino)-2-hydroxypropanesulfonic acid (MOPSO), phosphate, Piperazine-N,N'-bis(2-ethanesulfonic acid) (PIPES), Piperazine-N,N'-bis(2-hydroxypropanesulfonic acid) (POPSO), pyridine, polyvinylpyrrolidone (PVP), succinate, 3-{[Tris(hydroxymethyl)-methyl]-amino}-propanesulfonic acid (TAPS), 3-[N-Tris(hydroxymethyl)-methylamino]-2-hydroxypropanesulfonic acid (TAPSO), 2-Aminoethanesulfonic acid, AES (Taurine), trehalose, triethanolamine (TEA), 2-[Tris(hydroxymethyl)-methylamino]-ethanesulfonic acid (TES), N-[Tris(hydroxymethyl)-methyl]-glycine (tricine), Tris(hydroxymethyl)-aminomethane (Tris), glyceraldehydes, mannose, glucosamine, mannoheptulose, sorbose-6-phosphate, trehalose-6-phosphate, maleimide, iodoacetates, sodium citrate, sodium acetate, sodium phosphate, sodium tartrate, sodium succinate, sodium maleate, magnesium acetate, magnesium citrate, magnesium phosphate, ammonium acetate, ammonium citrate, ammonium phosphate, among other buffers.

As such, the biological sample assay composition and the laminating fluidic composition (e.g., flowing buffer) are combined in a manner sufficient to produce a laminar flow in which the biological sample assay composition and the laminating fluidic composition are flowing in distinct but adjacent and contacting flow paths. In some embodiments, the density of the laminating fluidic composition and the biological assay composition differ in order to facilitate the movement of a component from the biological assay composition to the laminating fluidic composition, or vice versa. For example, in some instances the density difference between the laminating fluidic composition and the biological assay composition is 0.01% or greater, such as 0.05% or greater, such as 0.1% or greater, such as 0.5% or greater, such as 1% or greater, such as 2% or greater, such as 5% or greater and including 10% or greater. An upper limit density difference between the laminating fluidic composition and the biological assay composition in the subject methods may, in certain instances be 25% or less, such as 20% or less, 15% or less, such as 10% or less and including 5% or less.

In practicing the subject methods, a transducer (e.g., piezoelectric transducer) located adjacent to the flow channel is activated to create an acoustic standing wave in the channel. The applied standing wave exerts acoustic radiation pressure to particles of a predetermined size contained in the biological sample assay composition so as to move these particles towards the pressure node formed in the center of the flow channel (e.g., to a focusing zone in the flowing biological sample assay composition). In embodiments of the present disclosure, the applied acoustic standing wave is sufficient to separate components of the biological sample assay composition. In certain instances, the acoustic standing wave applied is sufficient to separate cells conjugated to one or more analyte-binding members from cellular debris, tissue matter and other non-cellular components. In other instances, the acoustic standing wave applied is sufficient to concentrate cells conjugated to one or more analyte-binding members from cells not conjugated to an analyte-binding member. In yet other instances, the acoustic standing wave applied is sufficient to wash the biological sample assay composition by removing excess analyte-binding members or staining reagent not bound to cells of the biological sample.

As discussed above, depending on the type of biological sample, in some instances larger components in the biological sample assay composition may include tissue, tissue fragments or cell aggregates and smaller components include individual cells, cellular debris or non-cellular macromolecules. In certain instances, larger components in the biological sample assay composition are cell aggregates and smaller components are individual cells, cellular debris and non-cellular macromolecules. Accordingly, in some embodiments, acoustically separating larger components in the biological sample assay composition from smaller components includes separating tissue, tissue fragments or cell aggregates, from individual cells, cellular debris and non-cellular macromolecules. In other embodiments, acoustically separating larger components from smaller components includes separating cell aggregates from individual cells, cellular debris and non-cellular macromolecules in the disrupted biological sample. In yet other embodiments, acoustically separating larger components from smaller components includes separating individual cells from cellular debris and non-cellular macromolecules. In still other embodiments, acoustically separating larger components from smaller components includes separating individual cells from cellular debris. In another embodiment, acoustically separating larger components from smaller components includes separating individual cells from non-cellular macromolecules.

The frequency of the applied acoustic wave to acoustically separate components of the biological sample assay composition varies depending on the biological sample, the width of separation channel, composition of the buffer solution as well as desired separation of components and may be about 1.5 MHz or more, such as 2 MHz or more, such as 2.5 MHz or more, such as 3 MHz or more, such as 3.5 MHz or more, such as 4 MHz or more, such as 4.5 MHz or more, such as 5 MHz or more, such as 5.5 MHz or more and including about 6 MHz or more. For example, the frequency of applied acoustic wave may range from 1.0 MHz to 6 MHz, such as from 1.5 to 5.5 MHz, such as from 2 MHz to 5 MHz, such as from 2.5 to 4.5 MHz and including from 3 MHz to 4 MHz. An upper limit for the frequency of the applied acoustic wave may, in certain instances, be 10 MHz or less, such as 7.5 MHz or less, and including 5 MHz or less. In certain embodiments, the frequency of the acoustic wave that is applied corresponds to the fundamental resonance mode of the vibration transducer, such as for example 2.0 MHz for certain piezoelectric transducer plates. In other embodiments, the frequency of the applied acoustic wave corresponds to a harmonic of the vibration transducer, such as a first harmonic, a second harmonic and the like.

In some instances, the acoustic separator is configured such that the position of one or more acoustic nodes is determined by the speed of sound in the buffer solution employed and acoustic separator flow channel width, given by the equation $n = c/\lambda$ where n is the frequency, c is the speed of sound in the buffer employed and $\lambda$ is the width of the channel. For example, where the buffer is 1× phosphate buffer saline (PBS) (the speed of sound being 1500 m/s in 1×PBS) in an acoustic separator having a channel width of 375 μm, the resonant frequency is 4 MHz. In these embodiments, a node will occur in the center of the channel at ½ the resonant frequency (i.e., 2 MHz). Accordingly, higher multiples of this frequency will produce multiple nodes in the channel, which provide for a plurality of focusing streams. For example, in these embodiments, a 4 MHz frequency would produce 2 streams, while a 6 MHz frequency would produce 3 streams.

The acoustic pressure amplitude of the acoustic wave applied to separate components of the biological sample assay composition may also vary depending on the target components in the biological sample, rate of fluid flow during acoustic separation and may range from 0.01 MPa to 1 MPa, such as from 0.05 MPa to 0.95 MPa, such as from 0.1 MPa to 0.9 MPa, such as from 0.2 MPa to 0.8 MPa and including from 0.25 MPa to 0.75 MPa. In embodiments, the acoustic pressure amplitude of the applied acoustic wave is sufficient to acoustically separate individual cells, such as cells conjugated to an analyte-binding member from cell aggregates, cellular debris or non-cellular macromolecules.

The activation voltage that is applied to the piezoelectric transducer may also vary. For example, in certain aspects an activation voltage is 0.1 $V_{pp}$ to 100 $V_{pp}$ or higher, such as 0.1 $V_{pp}$ to 1 $V_{pp}$, 1 $V_{pp}$ to 10 $V_{pp}$, 10 $V_{pp}$ to 20 $V_{pp}$, 20 $V_{pp}$ to 30 $V_{pp}$, 30 $V_{pp}$ to 40 $V_{pp}$, 40 $V_{pp}$ to 50 $V_{pp}$, 50 $V_{pp}$ to 75 $V_{pp}$, 75 $V_{pp}$ to 100 $V_{pp}$, or 100 $V_{pp}$ or higher.

In certain embodiments, the rate of acoustic separation is 1 μl/min or more. For example, in certain aspects the rate is 10 μl/min or more, including 10 μl/min to 50 μl/min, 50 μl/min to 100 μl/min, 100 μl/min to 200 μl/min, 200 μl/min to 300 μl/min, 300 μl/min to 400 μl/min, 400 μl/min to 500 μl/min, 500 μl/min to 600 μl/min, 600 μl/min to 700 μl/min, 700 μl/min to 800 μl/min, 800 μl/min to 900 μl/min, 900 μl/min to 1 ml/min, 1 ml/min to 10 ml/min, 10 ml/min to 20 ml/min, 20 ml/min to 30 ml/min, 30 ml/min to 40 ml/min, 40 ml/min to 50 ml/min, 50 ml/min to 60 ml/min, 60 ml/min to 70 ml/min, 70 ml/min to 80 ml/min, 80 ml/min to 90 ml/min, 90 ml/min to 100 ml/min, 100 ml/min to 150 ml/min, 150 ml/min to 200 ml/min, 200 ml/min to 500 ml/min, or 500 ml/min to 1 L/min. In certain aspects, the flow rate during acoustic separation of larger components in the biological sample assay composition from smaller components is adjusted such that output is optimal for subsequent analysis by a feedback monitor, e.g., 20 to 150 μL/min, including 30 to 100 μL/min, such as 40-60 μL/min.

In some embodiments, methods include monitoring the biological sample assay composition at the outlet of the acoustic separator. Monitoring the biological sample assay composition includes, in certain instances, assessing (either by a human or with the assistance of a computer, if using a computer-automated process initially set up under human direction) the biological sample assay composition to measure the extent of washing at the outlet of the acoustic separator. In some instances, assessing the extent of washing by the acoustic separator includes determining the cellular makeup of the biological sample assay composition, such as by identifying, counting or characterizing the type of each cell in the washed biological sample assay composition. In other instances, assessing the extent of washing by the acoustic separator includes determining the makeup of the waste fluid, such as by identifying or characterizing compounds present in the waste fluid (e.g., excess stain, unbound analyte-specific binding members, non-cellular macromolecules, cellular debris, etc.).

In embodiments, monitoring may include continuously collecting real-time data, such as by employing a detector (e.g., laser scatter detector, optical absorption detector) to assess the washed biological sample assay composition. For example, monitoring the washed biological sample assay composition may include positioning a laser scatter detector near the central outlet of the acoustic separator in a region of hydrodynamic focusing to assess the makeup of the washed biological sample. Examples of using a laser and laser scatter detector to assess biological sample assay composition washing are described in *Practical Flow Cytometry*, 4th ed., John Wiley & Sons, Inc.; Hoboken, N.J. (2003), the disclosure of which is herein incorporated by reference. In other embodiments, monitoring the washed biological sample assay composition includes capturing one or more images of the acoustic separator. For example, an imaging sensor positioned adjacent to the acoustic separator may be configured to capture the acoustic separator in a predetermined detection field. By "detection field" is meant the region of the acoustic separator that is imaged by the one or more imaging sensors and may vary depending on the characteristics of the washed sample being monitored, spanning 0.001 mm or more of the acoustic separator, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more and including 10 mm or more of the acoustic separator. For example, methods may include capturing one or more images of the acoustic separator to determine the amount of assay reagent stain transferred to the laminating wash fluid in the acoustic separator. One or more images may be captured in each detection field, such as 2 or more images of the acoustic separator in each detection field, such as 3 or more images, such as 4 or more images, such as 5 or more images, such as 10 or more images, such as 15 or more images and including 25 or more images. Where more than one image is captured in each detection field, the plurality of images may be automatically stitched together by a processor having digital image processing algorithm.

In other embodiments, monitoring includes assessing the cellular makeup of the washed biological sample assay composition at regular intervals, such as every 1 minute, every 5 minutes, every 10 minutes, every 30 minutes, every 60 minutes or some other interval.

Methods of the present disclosure may also include a step of assessing the cellular makeup of the washed biological sample assay composition to identify any desired adjustments to the processing protocol. In other words, methods include providing feedback based on monitoring the cellular makeup of the washed biological sample assay composition, where adjustments may vary in terms of goal, where in some instances the desired adjustment are adjustments that ultimately result in improved quality of the washed biological sample assay composition or an increase in the quantity of target cells collected. In certain embodiments, where feedback provided by monitoring the washed biological sample assay composition indicates that a single interval of through the acoustic separator is not sufficient to provide the desired quantity of target cells from the biological sample, methods may include re-directing the washed biological assay composition through the acoustic separator for one or more additional washing intervals. In other words, the subject methods may, in certain instances, include multiple washing intervals. By "multiple washing intervals" is meant that the biological sample assay composition is flowed through the acoustic separator two or more times in sequential manner. The number of washing intervals in a multiple washing interval protocol may vary, depending on the types and number of target cells in the biological sample as well as the amount of cells desired and the similarity in size between the target cells. In practicing the subject methods, multiple interval protocols may include two or more washing intervals, such as three or more washing intervals, such as four or more washing intervals, such as five or more washing intervals, including ten or more washing intervals. Accordingly, to facilitate a multi-interval washing protocol, the subject acoustic separator component in flow cytometers of interest may include a conduit for redirecting the washed biological sample assay composition from the outlet of the acoustic separator back to the inlet or the subject systems (as described in greater detail below) may include two or more sequentially positioned and fluidically coupled acoustic separators.

The duration between each washing interval may vary, such as 0.1 minute or more, such as 0.5 minutes or more, such as 1 minute or more, such as 2 minutes or more, such as 3 minutes or more, such as 5 minutes or more and including 10 minutes or more.

As discussed above, methods may include monitoring the cellular makeup of the washed biological sample. In certain embodiments, where feedback provided by monitoring the cellular makeup of the washed biological sample indicates that a particular protocol does not provide an adequately washed biological sample assay composition, methods may include changing one or more parameters of the washing protocol. In one example, where the makeup of the washed biological sample assay composition is determined to contain excess assay reagent (e.g., excess stain, unbound analyte-specific binding members) or an excess of non-target cells and cell aggregates, methods may include adjusting the flow rate of the biological sample assay composition through the acoustic separator in response to the determined makeup. In some embodiments, the flow rate through the acoustic separator may be increased, such as by 1 µl/min or more, such as by 3 µl/min or more, such as by 5 µl/min or more, such as by 10 µl/min or more, such as by 25 µl/min or more, such as by 50 µl/min or more, such as by 100 µl/min or more and including increasing the flow rate through the acoustic separator by 500 µl/min or more. In other embodiments, the flow rate through the acoustic separator may be decreased, such as by 1 µl/min or more, such as by 3 µl/min or more, such as by 5 µl/min or more, such as by 10 µl/min or more, such as by 25 µl/min or more, such as by 50 µl/min or more, such as by 100 µl/min or more and including decreasing the flow rate through the acoustic separator by 500 µl/min or more.

In another example, where the makeup of the washed biological sample assay composition is determined to contain an excess of components larger than the target cells (e.g., tissue, tissue fragments) or components smaller than the target cells (cellular debris, non-cellular macromolecules), methods may include adjusting the acoustic field strength in the flow channel of the acoustic separator. In some embodiments, the acoustic field strength in the flow channel of the acoustic separator is reduced, such as by 10% or more, such as by 15% or more, such as by 25% or more, such as by 50% or more and including by 75% or more. In other embodiments, the acoustic field strength in the flow channel of the acoustic separator may be increased, such as by 10% or more, such as by 15% or more, such as by 25% or more, such as by 50% or more and including by 75% or more. In these embodiments, the frequency of the applied acoustic wave may be increased, such as increasing the frequency of the applied acoustic wave by 0.01 MHz or more, such as by 0.05 MHz or more, such as by 0.1 MHz or more, such as by 0.5 MHz or more and including increasing the frequency of the applied acoustic wave by 1 MHz or more or may be decreased, such as by decreasing the frequency of applied acoustic wave by 0.01 MHz or more, such as by 0.05 MHz or more, such as by 0.1 MHz or more, such as by 0.5 MHz or more and including decreasing the frequency of the applied acoustic wave by 1 MHz or more.

Aspects of the present disclosure further include analyzing the washed biological assay composition with the flow cytometer. Suitable flow cytometry systems and methods for analyzing samples include, but are not limited to those described in Ormerod (ed.), Flow Cytometry: A Practical Approach, Oxford Univ. Press (1997); Jaroszeski et al. (eds.), Flow Cytometry Protocols, Methods in Molecular Biology No. 91, Humana Press (1997); Practical Flow Cytometry, 3rd ed., Wiley-Liss (1995); Virgo, et al. (2012) Ann Clin Biochem. January; 49(pt 1):17-28; Linden, et. al., Semin Throm Hemost. 2004 October; 30(5):502-11; Alison, et al. J Pathol, 2010 December; 222(4):335-344; and Herbig, et al. (2007) Crit Rev Ther Drug Carrier Syst. 24(3):203-255; the disclosures of which are incorporated herein by reference. In certain instances, flow cytometry systems of interest include BD Biosciences FACSCanto™ flow cytometer, BD Biosciences FACSVantage™, BD Biosciences FACSort™, BD Biosciences FACSCount™, BD Biosciences FACScan™, BD Biosciences FACSCalibur™ systems, a BD LSRFortessa™ cell sorter, a BD Biosciences Influx™ cell sorter, BD Biosciences Jazz™ cell sorter, and BD Biosciences Aria™ cell sorter or the like.

In certain embodiments, the subject systems are flow cytometer systems which incorporate one or more components of the flow cytometers described in U.S. Pat. Nos. 3,960,449; 4,347,935; 4,667,830; 4,704,891; 4,770,992; 5,030,002; 5,040,890; 5,047,321; 5,245,318; 5,317,162; 5,464,581; 5,483,469; 5,602,039; 5,620,842; 5,627,040; 5,643,796; 5,700,692; 6,372,506; 6,809,804; 6,813,017; 6,821,740; 7,129,505; 7,201,875; 7,544,326; 8,140,300; 8,233,146; 8,753,573; 8,975,595; 9,092,034; 9,095,494 and 9,097,640; the disclosures of which are herein incorporated by reference.

FIG. 1 illustrates an example workflow for processing and analyzing a biological sample according to certain embodiments. As illustrated in FIG. 1, a biological sample (e.g., a fine needle aspirate obtained for biopsy) is taken from an in vivo source (panel 101). The biological sample is contacted with a dried assay reagent (panel 102) and stored for a predetermined period of time to conjugate analyte binding members in the assay reagent with target analytes (e.g., cells) of the biological sample to produce a biological sample assay composition. The biological assay composition is input directly from the containers of the dried assay reagent (panel 3) into the inlet of a flow cytometer with an integrated acoustic separator separating larger components from smaller components. In certain embodiments, outlets from the acoustic separator convey the smaller components such as excess assay reagent (e.g., stain, unbound analyte binding members) with wash buffer to a waste reservoir, while target components (e.g., cells bound to analyte-specific binding members) are conveyed for analysis into the sample flow system of the flow cytometer.

Flow Cytometer Systems for Processing and Analyzing a Biological Sample

Aspects of the present disclosure further include flow cytometer systems for practicing the subject methods. In embodiments, systems which include a sample input and a sample concentrator integrated into the sample flow system of the flow cytometer that includes an acoustic separator having a flow channel with an inlet and an outlet and an acoustic field generator positioned adjacent to the flow channel configured to produce an acoustic field in the flow channel. In certain aspects, flow cytometer systems further include a detector positioned at the outlet of the flow channel of the acoustic separator and a feedback monitor for assessing the processed biological sample in the flow cytometer.

As summarized above, aspects of the present disclosure include processing and analyzing a biological sample assay composition produced by contacting a biological sample with an assay reagent. The subject devices are configured as a flow-through system for sequentially processing and immediately analyzing the processed biological sample assay compositions. By "flow-through" is meant that the biological sample assay composition enters the system through an inlet of the flow cytometer, is carried through a flow path of the sample concentrator, such as a flow channel, exits the sample concentrator through an outlet and directly into the sample flow system of the flow cytometer. The subject systems may be configured to carry a continuous stream or process discrete volumes of the biological sample assay composition, separating particles (e.g., cells) based on the acoustic contrast factors (also called an ϕ-factor; described below) and to perform continuous analysis of the processed biological sample assay composition by flow cytometry.

In embodiments, the acoustic separator has 1 or more inlets as desired, such as 2 or more inlets, such as 3 or more inlets and including 5 or more inlets. One or more of inlets of the acoustic separator is in fluid communication with the inlet of the flow cytometer and receives the biological sample assay composition from a syringe or other sample applicator. The acoustic separator also includes 1 or more outlets, such as 2 or more outlets, such as 3 or more outlets and including 5 or more outlets. In certain embodiments, the acoustic separator includes between 1 and 5 outlets, such as between 2 and 4 outlets and including 3 outlets.

Each of the inlets may be configured for introducing any component into the subject devices, such as for example the biological sample assay composition, reagents, solvents and buffers. Where the acoustic separator includes more than one inlet, each inlet may be employed to introduce the same or different components. For example, one inlet may be coupled to the inlet of the flow cytometer to receive the biological sample assay composition while one or more alternate inlets are employed for introducing a wash buffer or sheath fluid. Each desired component may be introduced into the inlet manually (e.g., by syringe or syringe pump) or by one or more injectors (e.g., computer controlled injection systems, peristaltic pump systems, etc.).

The flow rate through the acoustic separator may vary depending on the desired separation, concentration or subsequent analysis, as described in greater detail below. In certain embodiments, the system is configured to have a flow rate of 1 µL/min or more, such as 10 µL/min or more, including 30 µL/min or more, or 40 µL/min or more, or 50 µL/min or more, or 60 µL/min or more, or 80 µL/min or more, or 100 µL/min or more, or 200 µL/min or more, or 300 µL/min or more, or 400 µL/min or more, or 500 µL/min or more, or 750 µL/min or more, or 1 mL/min or more, or 2 mL/min or more, or 5 mL/min or more, or 10 mL/min or more, or 100 mL/min to 1 L/min. In some embodiments, the subject systems are configured to provide a constant flow rate. By "constant flow rate" is meant that the rate of fluid flow through the system increases or decreases by 2% or less, such as by 1.5% or less, such as by 1% or less, such as 0.5% or less, such as 0.5% or less and including changes by 0.1% or less.

As described in greater detail below, systems may also include additional devices for practicing the subject methods, such as a magnetic separation device, a feedback monitor and a second acoustic concentrator device. Moreover, systems may also include additional components such as, one or more valves (e.g., pinch valves, and the like), reservoirs (e.g., sample reservoirs, wash reservoirs, waste reservoirs, and the like), pumps (e.g., syringe pumps, peristaltic pumps, and the like), connective tubing (e.g., silicone tubing), housings, processors, and the like.

Components of the subject flow cytometer systems, such as the flow cytometer inlet, acoustic separator and flow cytometer analysis system may be fluidically connected to each other by one or more conduits. In certain aspects, the conduit is enclosed, such that the conduit is defined by outer walls that surround a central flow path. The central flow path may be aligned with a longitudinal axis of the conduit. The central flow path may have any convenient shape, such as, but not limited to, a flow path with a cross-sectional profile of a circle, an ellipse, a square, a rectangle, a pentagon, a hexagon, an irregular cross-sectional profile, combinations thereof, and the like. In certain embodiments, the conduit may have a height (e.g., for conduits that do not have a round cross-sectional profile) or an inner diameter (e.g., for conduits that have a round cross-sectional profile) of 5 cm or less, such as 2 cm or less, including 1 cm or less, or 7 mm or less, or 5 mm or less, or 3 mm or less, or 2 mm or less, or 1 mm or less. The length of the conduit may range from 1 cm to 1000 cm, such as from 2 cm to 750 cm, including from 5 cm to 500 cm, or from 5 cm to 250 cm, or from 10 cm to 100 cm, such as from 10 cm to 50 cm, for example from 10 cm to 25 cm.

Conduits of interest may include one or more flow paths, as desired. Depending on the number of outlets and inlets on each component, conduits may include 2 or more flow paths, such as 3 or more flow paths and including 5 or more flow paths. For example, the conduit positioned between the flow cytometer inlet and the acoustic separator may include from 1 to 5 flow paths, such as 3 flow paths.

The subject flow cytometer systems can be configured to for practicing the subject methods are any suitable temperature so long as the viability of the cells collected is preserved as desired. As such, systems may be configured to provide a temperature which ranges, such as from −80° C. to 100° C., such as from −75° C. to 75° C., such as from −50° C. to 50° C., such as from −25° C. to 25° C., such as from −10° C. to 10° C., and including from 0° C. to 25° C.

Aspects of the subject systems include one or more acoustic separators. Acoustic separators of interest are configured as a flow-through device. The flow-through acoustic separator may be configured to include one or more channels for carrying the biological sample assay composition into and out of the acoustic separator. Channels may have any convenient configuration. While the cross sectional shape may vary, in some instances, cross-sectional shapes of channels of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion, etc. In certain embodiments, the acoustic separator is a surface acoustic separator having a substrate and microfluidic channel at the surface of the substrate. The dimensions of the channel in the acoustic separator may vary, such as from 100-550 µm×50-250 µm×20-100 mm, such as 150-500 µm×75-200 µm×25-75 mm, such as 200-400 µm×100-200 µm×30-60 mm.

The acoustic separator may have 1 or more inlets and outlets as desired. As discussed above, at least one inlet of the acoustic separator is in fluid communication with the flow cytometer inlet so as to receive the inputted biological sample assay composition. For example, the acoustic separator may have 1 or more inlets, such as 2 or more inlets, such as 3 or more inlets and including 5 or more inlets. In certain embodiments, the acoustic separator includes between 1 and 5 inlets, such as between 2 and 4 inlets and including 3 inlets. The acoustic separator may also include 1 or more outlets, such as 2 or more outlets, such as 3 or more outlets and including 5 or more outlets. In some embodiments, the acoustic separator includes at least 2 outlets, where a first outlet is fluidically coupled to the sample flow system of the flow cytometer for analysis of the processed biological sample assay composition and a second outlet is fluidically coupled to a waste reservoir for discarding any undesired components from the biological sample assay composition. In certain embodiments, the acoustic separator includes one or more outlets which re-direct the biological sample assay composition stream or waste stream back to the inlet of the acoustic separator so as to perform one or more subsequent washing intervals, as described above.

In some embodiments, acoustic separators may include, but are not limited to, those described in U.S. Pat. Nos. 8,956,536 and 6,929,750 and United States Patent Application Publication No. 20150177111, the disclosures of which are herein incorporated by reference; as well as those described in Laurell, et al. (2007) Chem. Soc. Rev., 2007, 36, 492-506; Petersson, et al. (2005) Analytical Chemistry 77: 1216-1221; and Augustsson, et al. (2009) Lab on a Chip 9: 810-818. In these embodiments, the acoustic concentrator devices operate in accordance with the Lund-method, where particles in the disrupted biological sample of different sizes are acoustically separated in a laminar flow microchannel ultrasonically actuated using an acoustic field generator (e.g., a piezoelectric ceramic). In certain embodiments, the width of the channel corresponds to half the desired ultrasonic wavelength, creating a resonator between the side walls of the flow channel in which a standing wave can be formed. In these embodiments, the induced standing wave is generated orthogonal to the incident ultrasonic wave front. Larger components of the disrupted biological sample with a positive φ-factor are moved during flow through the channel, by means of the axial primary radiation force (PRF), towards the pressure nodal plane along the channel center, while smaller components of the disrupted biological sample remain close to the side walls. Separation of the larger components from the smaller components is, in certain instances, completed by a split channel outlet configured to collect the separated larger components through a center outlet and the smaller components through one or more side outlets. In some embodiments, the acoustic standing wave is focused to the center of the flow channel. In these embodiments, the acoustic standing wave is configured to propagate within the channel applying an acoustic radiation pressure within the flow channel. In certain instances, the applied acoustic standing wave does not propagate outside of the flow channel. In certain embodiments, the acoustic field is applied only in a single direction by the vibration transducer. As such, in these embodiments the vibration transducer does not simultaneously apply acoustic fields in two or more different directions.

In some embodiments, the biological sample assay composition begins by flowing along the sides of the channel. An acoustic standing wave may be induced in the channel (e.g., using an acoustic field generator, such as a piezoelectric transducer, placed adjacent to the channel). The acoustic standing wave creates a pressure node in the center of the channel. An acoustic radiation force is exerted on larger components in the biological sample assay composition, such as tissue, tissue fragments and agglomerated cells, and these components are moved towards the center of the channel (i.e., the node of the acoustic standing wave), where these components are carried through the channel by a laminar flow of wash buffer. Smaller components in the biological sample assay composition, such as target cells conjugated to analyte-specific binding members, cellular debris and non-cellular macromolecules are retained along the walls of the channel and are carried by a different laminating flow of buffer. In these embodiments, by applying the acoustic standing wave to the biological sample assay composition, larger components are separated from smaller components in the biological sample assay composition within the channel of the acoustic separator.

Since in these embodiments, the fluidic flow through the acoustic separator is configured to be laminar, when an acoustic field is applied tissue, tissue fragments, tissue aggregates, cell aggregates and other agglomerated components of the biological sample assay composition are forced to the center of the channel into a laminate of flowing wash buffer (i.e., the node of the acoustic standing wave). These components exit the acoustic separator through a dedicated sample outlet while cells from the biological sample assay composition retained in parallel laminating sample streams along the channel wall may be directed to two or more alternate sample outlets.

Acoustic separators may be manufactured from any convenient rigid material. In some embodiments, the acoustic separator includes a substrate and the flow channel is a microfluidic channel that is positioned at the surface of the substrate. In certain aspects, one or more flow channels are made by etching (e.g., anisotropically etching) a channel in silicon, steel, glass (e.g., Pyrex glass), Poly(methyl methacrylate), polycarbonate, or any other convenient material. The channel(s) may be sealed using a membrane sealed atop the channel. Any convenient membrane type may be used, such as glass (e.g., boron silica glass). In certain embodiments, the flow channel consists of pyrex glass. In other embodiments, the flow channel consists of boron silica glass. In some embodiments, the flow channel does not include any reflective surfaces within or along the surface which may be configured for reflecting or altering the propagation of the acoustic wave. In other embodiments, the flow channel does not include any capture agents or surface etching for trapping particles along the surface of the flow channel.

In certain aspects, an acoustic field generator is bonded to the bottom of the channel. Acoustic field generators of interest include, but are not limited to, surface acoustic wave generators, piezoelectric transducers such as PZT. In certain aspects, the piezoelectric transducer is of the multi-layer type, but a bimorph piezoelectric element may also be used as well as any other kind of ultrasound generating element with suitable dimensions. In some embodiments, the vibration transducer and the flow channel may be integrated together in the acoustic separator. In these embodiments, the vibration transducer and the flow channel form a single component acoustic separator.

The acoustic field generator may be of any desirable shape, and in some instances may be a cube or bar-shaped piezoelectric transducer. In certain embodiments, the acoustic field generator is a cube or bar-shaped piezoelectric transducer having a substantially flat face positioned proximal to the conduit of the acoustic concentrator device. By "having a substantially flat face" is meant that the acoustic field generator does not wrap (wholly or partially) around the conduit of the acoustic concentrator device. As such, in these embodiments, the acoustic field generator is bar-shaped or cube-shaped having one of the flat edge faces positioned proximal to the conduit. In certain embodiments, the frequency of the acoustic wave that is applied corresponds to the fundamental resonance mode of the vibration transducer (e.g., about 2 MHz for many PZT plates). The frequency may, in some embodiments, instead correspond to a harmonic of the vibration transducer, such as a first harmonic, second harmonic, and the like. In various aspects, the frequency applied may be about 1.5 MHz or more, such as 2 MHz or more, such as 2.5 MHz or more, such as 3 MHz or more, such as 3.5 MHz or more, such as 4 MHz or more, such as 4.5 MHz or more, such as 5 MHz or more, such as 5.5 MHz or more and including about 6 MHz or more. For example, the frequency of applied acoustic wave may range from 1.0 MHz to 6 MHz, such as from 1.5 to 5.5 MHz, such as from 2 MHz to 5 MHz, such as from 2.5 to 4.5 MHz and including from 3 MHz to 4 MHz. An upper limit for the frequency of the applied acoustic wave may, in certain instances, be 10 MHz or less, such as 7.5 MHz or less, and including 5 MHz or less.

In certain embodiments, the amplitude of acoustic wave remains constant when applied to the sample flow in the acoustic separator. As such, in these embodiments, the amplitude of the applied acoustic wave is configured to increase or decrease by 2% or less when applied to the sample flow in the acoustic concentrator device, such as by 1.5% or less, such as by 1% or less, such as by 0.5% or less, such as by 0.25% or less, such as by 0.1% or less, such as by 0.05% or less and including 0.01% or less.

The acoustic pressure amplitude of the acoustic wave applied may vary depending on the density and rate of particles and fluid flowing through the acoustic concentrator device and may range from 0.01 MPa to 1 MPa, such as from 0.05 MPa to 0.95 MPa, such as from 0.1 MPa to 0.9 MPa, such as from 0.2 MPa to 0.8 MPa and including from 0.25 MPa to 0.75 MPa.

The activation voltage that is applied may also vary. For example, in certain aspects an activation voltage is $0.1\ V_{pp}$ to $100\ V_{pp}$ or higher, such as $0.1\ V_{pp}$ to $1\ V_{pp}$, $1\ V_{pp}$ to $10\ V_{pp}$, $10\ V_{pp}$ to $20\ V_{pp}$, $20\ V_{pp}$ to $30\ V_{pp}$, $30\ V_{pp}$ to $40\ V_{pp}$, $40\ V_{pp}$ to $50\ V_{pp}$, $50\ V_{pp}$ to $75\ V_{pp}$, $75\ V_{pp}$ to $100\ V_{pp}$, or $100\ V_{pp}$ or higher.

In certain embodiments, an acoustic separator is controlled by a processor that is configured to control the acoustic field generator. The processor may be contained within a control unit or control box in the flow cytometer. For instance, the processor may be configured to control the acoustic field generator by altering one or more of the shape, frequency and power of the electrical energy delivered to the acoustic field generator.

Flow cytometer systems of interest may be configured to provide a flow rate of the biological sample assay composition through the acoustic separator that varies. In certain embodiments, the flow rate of through acoustic separator is adjusted such that the output from the acoustic separator is optimal for feedback monitoring, such as 20 to 150 μL/min, including 30 to 100 μL/min, such as 40 to 60 μL/min. The flow rate through the acoustic separator may also be adjusted such that the output from the acoustic separator is optimal for subsequent analysis by the flow cytometer.

In certain aspects, flow cytometer systems of interest may be configured to provide a flow rate of the biological sample assay composition through the acoustic separator by modulating one or more pumps (e.g., a syringe pump, such as a WPI sp210iwz distributed by World Precision Instruments Inc., Sarasota, Fla.) or valves (e.g., pinch valves). The flow rate may, in certain embodiments, be controlled by a processor, such as a processor described above.

In certain aspects, the rate at which the acoustic separator separates larger components from smaller components in the biological sample assay composition is 1 μl/min or more. For example, in certain embodiments the rate is 10 μl/min or more, including 10 μl/min to 50 μl/min, 50 μl/min to 100 μl/min, 100 μl/min to 200 μl/min, 200 μl/min to 300 μl/min, 300 μl/min to 400 μl/min, 400 μl/min to 500 μl/min, 500 μl/min to 600 μl/min, 600 μl/min to 700 μl/min, 700 μl/min to 800 μl/min, 800 μl/min to 900 μl/min, 900 μl/min to 1 ml/min, 1 ml/min to 10 ml/min, 10 ml/min to 20 ml/min, 20 ml/min to 30 ml/min, 30 ml/min to 40 ml/min, 40 ml/min to 50 ml/min, 50 ml/min to 60 ml/min, 60 ml/min to 70 ml/min, 70 ml/min to 80 ml/min, 80 ml/min to 90 ml/min, 90 ml/min to 100 ml/min, 100 ml/min to 150 ml/min, 150 ml/min to 200 ml/min, 200 ml/min to 500 ml/min, or 500 ml/min to 1 L/min.

In certain embodiments, the acoustic separator is configured to separate components of the biological sample assay composition based on size. For example, depending on the components of the biological sample assay composition, the acoustic separator may be configured separate out components which have diameters of 5 μm or greater, such as 10 μm or greater, such as 25 μm or greater, such as 50 μm or greater and including 100 μm or greater, such as from 10 to 25 μm, such as from 25 to 50 μm, such as from 50 to 75 μm and including from 75 to 100 μm. In some embodiments, the acoustic separator is configured to vary acoustic wave frequency and amplitude in a manner sufficient to separate tissue, tissue fragments and cell aggregates from target cells, cellular debris and non-cellular macromolecules in the biological sample assay composition. In other embodiments, the acoustic separator is configured to vary acoustic wave frequency and amplitude in a manner sufficient to separate target cells from cellular debris, non-cellular macromolecules as well as unbound analyte-specific binding members and excess stain from the assay reagent.

In some instances, to achieve a desired flow rate a plurality of parallel separation channels may be used in the acoustic separator. For example, in certain embodiments two or more parallel separation channels are used, including 3 or more, such as 5 or more, 8 or more, 15 or more, 25 or more, 40 or more, 60 or more, 80 or more, 100 or more, 125 or more, 150 or more, 200 or more, 300 or more, 400 or more, 500 or more, or 1000 or more. The separation channels may be contained on one or more chips, such as 2 or more, 5 or more, 10 or more, 20 or more, 50 or more, or 100 or more. Moreover, a plurality of vibration transducers may be used, such as 2 or more, 5 or more, or 10 or more. In certain embodiments, the acoustic separator includes a single transducer, such as a single piezoelectric transducer.

In embodiments, the subject flow cytometer systems may contain two or more integrated acoustic separators, such as 3 or more, including 4 or more, 5 or more, 6 or more, or 7 to 10. Where systems include 2 or more integrated acoustic separators, the acoustic concentrator devices may be arranged in any convenient configuration, such as in a serial configuration, parallel configuration, or a combination of the two. Moreover, where the subject flow cytometer systems contain 2 or more integrated acoustic separators, the acoustic separator may be substantially identical or heterogeneous (e.g., differ in one or more ways, such as in the dimensions of the flow channel, the applied voltage, the oscillation frequency, etc. or a combination of a surface acoustic separator and a cylindrical acoustic separator). Where systems include more than one integrated acoustic separators, the number of inlets and outlets may be the same or different for each acoustic separator.

In certain instances, the subject flow cytometer systems include at least two integrated acoustic separators, where a first acoustic separator, as described above, is configured to separate larger components (e.g., tissue, tissue aggregates, cell aggregates) from smaller components (target cells, cellular debris, non-cellular macromolecules) in the biological sample assay composition and a second acoustic separator configured to separate target cells from cellular debris, non-cellular macromolecules as well as unbound analyte specific binding members and excess stain from the assay reagent. The washed biological sample assay compositions is conveyed from an output of the first separator to an input of the second acoustic separator through one or more conduits. In certain embodiments, cellular debris, non-cellular macromolecules as well as unbound analyte specific binding members and excess stain from the assay reagent are carried through the second separator along the sides of the channel while target cells of the biological sample assay composition are focused to the center of the channel. The fluid at the outside of the channel and the fluid at the center operate, in certain embodiments, under laminar flow.

A transducer is positioned proximal to the conduit and is activated to create an acoustic standing wave. In these embodiments, the applied standing wave exerts acoustic radiation pressure to the cells sufficient to move the cells towards the pressure node formed at the center of the conduit (e.g., to a focusing zone in the flowing buffer). In embodiments of the present disclosure, the applied acoustic standing wave is sufficient to separate the cells from cellular debris such as dead or lysed cells, cell fragments and free organelles as well as from non-cellular macromolecules such as enzymes, proteins lipids and nucleic acid fragments as well as to wash excess assay reagent, such as unbound analyte specific binding members and stain. For example, methods may include concentrating the target cells conjugated to analyte specific binding members of the assay reagent at the node of the acoustic standing wave in the flow buffer while retaining excess assay reagent along the sides of acoustic separator conduit. The cells are then carried out of the second acoustic separator and collected through a center outlet. The separated cellular debris, non-cellular macromolecules as well as unbound analyte specific binding members and excess stain from the assay reagent are carried out of the second acoustic separator and collected through two or more side outlets.

Figure 2:
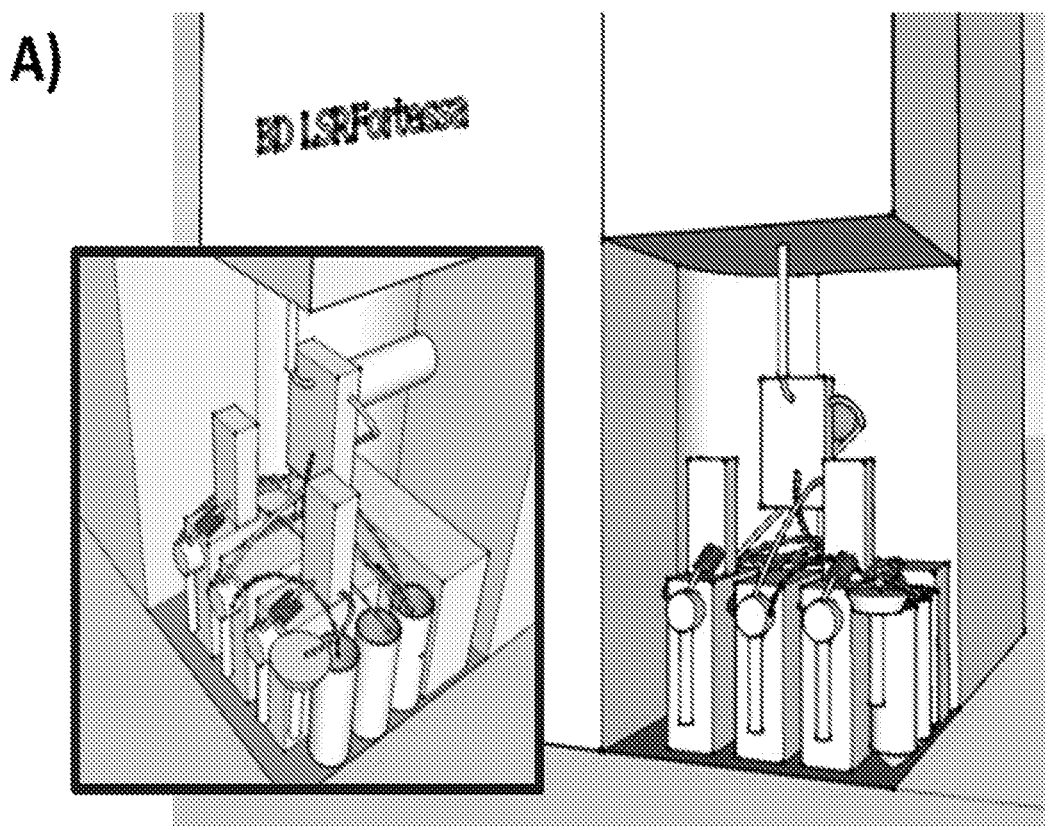
FIG. 2, panels A-B illustrate a flow cytometer having an integrated acoustic separator for processing and directly analyzing a biological sample assay composition according to certain embodiments.

An example of a flow cytometer having an integrated acoustic separator for processing and directly analyzing a biological sample assay composition according to certain embodiments is illustrated in FIGS. 2A-B. FIG. 2A depicts a graphical representation of and FIG. 2B provides a photograph of a flow cytometer sampling system configured for receiving and processing the biological sample assay composition according to certain embodiments. The sampling system of the flow cytometer includes reservoirs for waste, wash buffer and the biological sample assay composition. Each of the wash, waste and biological sample assay composition reservoirs are in fluid communication with the acoustic separator. Biological sample assay composition is taken from its corresponding reservoir and inputted into the acoustic separator with a laminating flow of wash buffer. Application of an acoustic standing wave is sufficient to separate larger components (e.g., target cells with conjugated analyte-specific binding members) from smaller components (e.g., excess assay reagent such as unbound analyte-specific binding members and stain). In embodiments, excess assay reagent is carried from the inputted biological sample assay composition into the wash buffer stream by the applied acoustic wave and outputted into the waste reservoir through one or more side outlets.

Acoustic separators as described above may in some aspects also contain one or more additional components. Examples of such components include, but are not limited to, one or more valves (e.g., pinch valves, and the like), reservoirs (e.g., sample reservoirs, wash reservoirs, waste reservoirs, and the like), pumps (e.g., syringe pumps, peristaltic pumps, and the like), connective tubing (e.g., silicone tubing), housings, processors, and the like.

As discussed above, the cellular makeup of the washed biological sample assay composition flowed through the acoustic separator may be assessed in order to identify any desired adjustments necessary to the processing protocol. Aspects of the subject flow cytometer systems, in certain embodiments, further include a feedback monitor configured to assess the cellular makeup of the biological sample assay composition. Feedback monitors of interest are configured to measure both the quality of the processed biological sample assay composition (e.g., the ratio of labelled target cells to cell aggregates) as well as the quantity of target cells in the washed biological sample assay composition.

In some embodiments, feedback monitors collect real-time data about the processed biological sample assay composition. In other embodiments, feedback monitors are configured to assess cellular makeup of the biological sample assay composition at regular intervals, such as every 1 minute, every 5 minutes, every 10 minutes, every 30 minutes, every 60 minutes or some other interval. In yet other embodiments, feedback monitors are configured to assess the cellular makeup of the biological sample assay composition after every processing interval, after every 2 processing intervals, after every 3 processing intervals or after some other number of intervals.

Feedback monitors of interest may include any suitable device which is configured to assess compounds in a fluidic sample and may include but is not limited to optical scatter sensors, laser scatter sensors, laser diffraction sensors, optical absorption sensors, emission sensors as well as imaging sensors configured to capture one or more images of the acoustic separator in a detection field. Systems may include one or more feedback monitors, as desired, such two or more, such as three or more, such as four or more and including five or more feedback monitors.

In certain embodiments, feedback monitors include one or more imaging sensors configured to capture images of the acoustic separator in a detection field. The imaging sensor may be any suitable device capable of capturing and converting an optical image into electronic data signal, including but not limited to charge-coupled devices, semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera.

In certain aspects, feedback monitors are configured to allow the subject flow cytometer systems to operate in a closed-loop fashion. For example, in some embodiments the feedback monitor may assess one or more characteristics of the biological sample assay composition, such as cellular makeup of the biological sample assay composition, amount of assay reagent remaining or excess stain and unbound analyte-specific binding member present. The system may change one or more parameters of the acoustic separators on a substantially real-time basis to automatically obtain more efficient results or to optimize the processing rates depending on user requirements. For example, the system may alter the flow rate from the flow cytometer inlet to the acoustic separator, the flow rate through the acoustic separator, the frequency of the acoustic field generator of an acoustic separator, the power applied to the acoustic field generator, etc. In certain aspects, such a closed-loop system may involve applying one or more statistical or learning machine algorithms, such as genetic algorithms, neural networks, hidden Markov models, Bayesian networks, and the like.

In certain embodiments, systems include a biological sample assay composition preparatory apparatus that is fully automated. By "fully automated" is meant that the biological sample assay composition preparatory apparatus receives the biological sample and contacts the biological sample with an assay reagent with little to no human intervention or manual input into the subject systems. In certain embodiments, the subject systems are configured to contact the biological sample with assay reagent and input the biological sample assay composition into the flow cytometer with integrated acoustic separator without any human intervention.

In some embodiments, biological sample assay composition preparatory apparatus includes a sampling device that provides the biological sample and assay reagent and contacting device for contacting the biological sample with the assay reagent. The sampling device may be any convenient device in fluid communication with each source of a biological sample and assay reagent, such as for example, a high throughput sample changer having a plurality of reagent vials containing biological samples and assay reagents. The sampling device may also include syringes, needles, pipets, aspirators, among other sampling devices. The contacting apparatus may be any suitable apparatus which allows for a biological sample to be contacted with an assay reagent. For example, in some embodiments, the contacting apparatus is a sample chamber (e.g., enclosed, sealed, air-tight, open, plate, etc.). In other embodiments, the contacting apparatus is a microtube. In other embodiments, the contacting apparatus is a test tube. In yet other embodiments, the contacting apparatus is a glass flask (e.g., beaker, volumetric flask, Erlenmeyer flask, etc.). In still other embodiments, the contacting apparatus is a 96-well plate.

In certain embodiments, the contacting apparatus of the subject systems may further include an agitator for mixing the biological sample assay composition. The agitator may be any convenient agitator sufficient for mixing the subject compositions, including but not limited to vortexers, sonicators, shakers (e.g., manual, mechanical, or electrically powered shakers), rockers, oscillating plates, magnetic stirrers, static mixers, rotators, blenders, mixers, tumblers, orbital shakers, among other agitating protocols.

In embodiments, the subject systems include a flow cytometer for sorting or analyzing the processed and washed biological sample assay composition, e.g., as described above.

Figure 3:
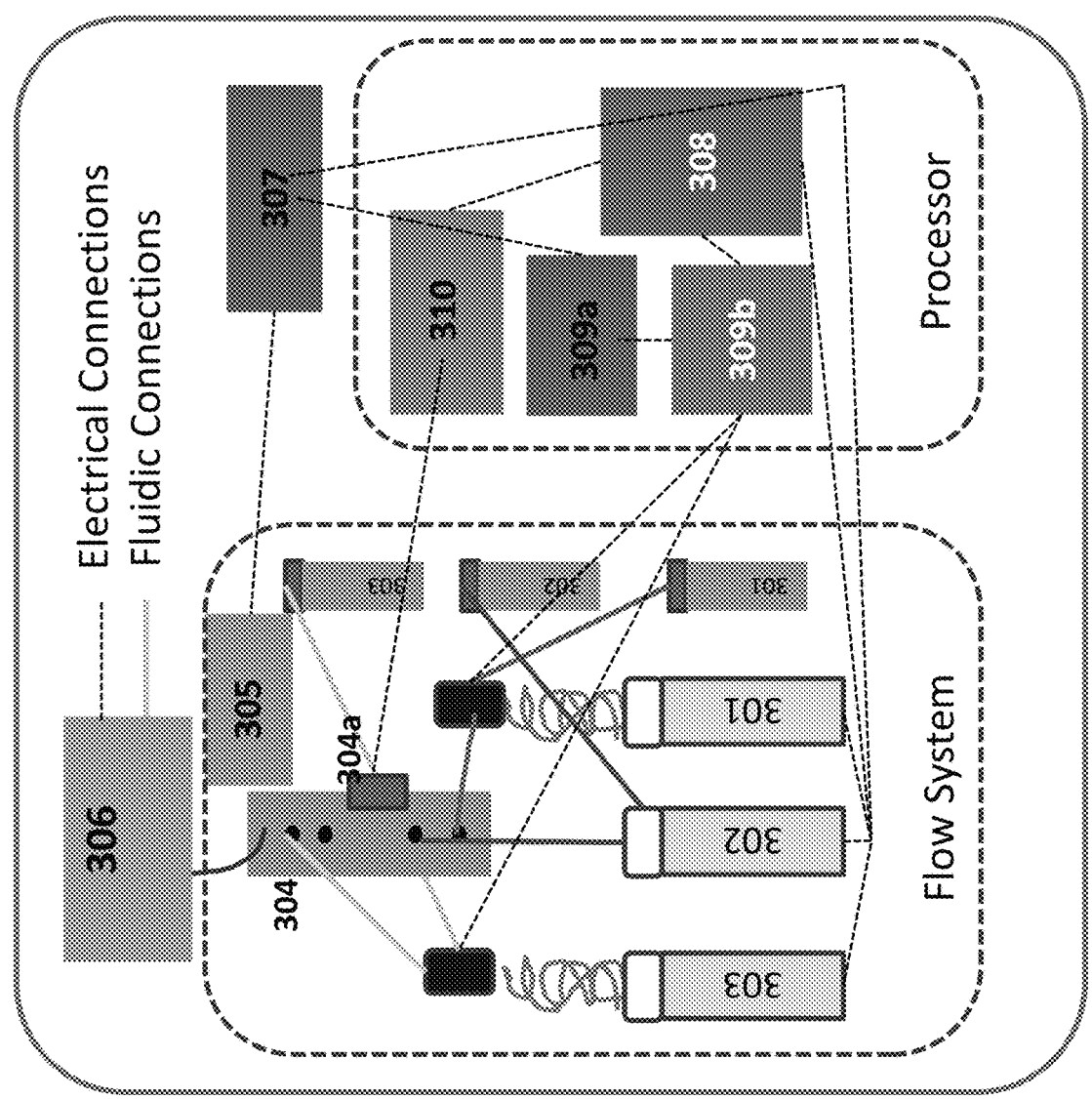
FIG. 3 illustrates a schematic of a system for processing and analyzing a biological sample assay composition according to certain embodiments.

FIG. 3 illustrates a schematic of a system for processing and analyzing a biological sample assay composition according to certain embodiments. Flow cytometer system 300 includes reservoirs for the biological sample assay composition 301, wash buffer 302 and waste 303 in fluid communication with an acoustic separator 304 that is integrated into the flow cytometer system 300. The acoustic separator includes a piezoelectric transducer 304a for applying an acoustic standing wave in a flow channel of the acoustic separator 304. The acoustic separator is also configured with a feedback monitor 305, such as a laser scatter sensor or an imaging sensor (i.e., camera) for monitoring the processed biological sample assay composition inputted into the sample analysis flow system 306 of the flow cytometer. Flow cytometer system 300 also includes a processor 307 for controlling the fluidic system of the acoustic separator processing component of the flow cytometer. The processor includes control electronics 310 for applying an acoustic standing wave with a piezoelectric transducer 304a in the flow channel of the acoustic separator 304, power sources 308 for the pump conveying fluid from the wash buffer and biological sample assay composition reservoirs to and through the acoustic separator as well as switch board electronics 309a and 309b for controlling one or more valves at the inlets and outlets of the acoustic separators. Each of the valves in fluid communication with the waste, wash buffer and biological sample assay composition is also in electronic communication with the feedback monitor through the switch board of the processor such that flow through of each component can be controlled based on feedback determined with the feedback monitor. As discussed above, the processor may be configured to increase flow rate or applied acoustic field based on feedback regarding the processed biological sample.

Computer-Controlled Systems

Aspects of the present disclosure may further include computer controlled systems for practicing the subject methods, where the systems further include one or more computers for automation or semi-automation of a system for practicing methods described herein. In certain embodiments, systems include a computer having a computer readable storage medium with a computer program stored thereon, where the computer program when loaded on the computer includes algorithm for receiving a biological sample assay composition in the inlet of the flow cytometer; algorithm for flowing the biological sample assay to an acoustic separator; algorithm for washing the biological sample assay composition by acoustically separating larger components from smaller components and algorithm for sorting cells in the processed biological sample assay composition with the flow cytometer.

In embodiments, the system includes an input module, a processing module and an output module. In some embodiments, the subject systems may include an input module such that parameters or information about each biological sample (e.g., needle aspirate), frequency and amplitude of applied acoustic wave in the acoustic separator, activation voltage of the vibration transducer, laser scatter and captured images from the feedback monitor, etc. may be inputted into the computer. The processing module includes memory having a plurality of instructions for performing the steps of the subject methods, such as contacting a biological sample with an assay reagent to produce the biological sample assay composition; acoustically separating larger components from smaller components; and analyzing the washed biological sample assay composition with the flow cytometer.

After the processing module has performed one or more of the steps of the subject methods, an output module communicates the results (e.g., the amount and types of cells present in the biological sample) to the user, such as by displaying on a monitor or by printing a report.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (e.g., smartphone). In these embodiments, input manager receives information, e.g., parameters or information about each biological sample, frequency of applied acoustic wave in the acoustic concentrator device, amplitude of the applied acoustic wave in the acoustic concentrator device, activation voltage of the acoustic concentrator device, magnetic field strength, magnetic field homogeneity, flow rate through each component of the subject systems, laser scatter calibration data from the feedback monitor, etc. Input manager processes and forwards this information to the processing module. These functions are performed using any convenient technique.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g, over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Kits

Also provided are kits for practicing one or more embodiments of the above-described methods. The subject kits may include various components and assay reagents. In some instances, the kits include at least assay reagents used in the subject methods (e.g., as described above, as well as wash solutions or buffers for washing the biological sample assay composition, empty syringes for delivering biological sample, assay reagent or wash buffer into the flow cytometer or preparatory apparatus. In other instances, kits include a computer readable medium having a computer program stored thereon, wherein the computer program, when loaded into a computer, operates the computer to perform a flow cytometric assay as described herein; and a physical substrate having an address from which to obtain the computer program.

In addition to the above components, the subject kits may further include instructions for practicing the methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., CD, DVD, Blu-Ray, flash memory, etc., on which the information has been recorded. Yet another means that may be present is a website address which may be used via the Internet to access the information at a removed site.

Utility

The subject methods and systems and kits find use in a variety of different applications where it is desirable to process and analyze a biological sample, in particular where the biological sample is small in volume or where target components in the biological sample may be present at a low concentration. In embodiments, the subject methods and devices facilitate processing target cells is a fluidic or tissue biological sample and analysis of the prepared biological sample assay composition directly with a flow cytometer in the absence of any centrifugation, washing or other type of purification. The subject methods also find use where high throughput analysis is desirable so that specimen analysis, such as a needle aspirate biopsy specimen, can be conducted without individual sample preparation on a microscope slide.

The present disclosure also finds use in applications where biological sample assay composition prepared from a biological sample may be desired for research, laboratory testing or diagnosis in a clinical setting. For example, the subject methods and systems facilitate processing and analyzing a biological sample having cells as a research or diagnostic specimen for diseases such as cancer. Methods and systems of the present disclosure also allow for assaying a biological sample (e.g., organ, tissue, tissue fragment, fluid) at high efficiency, high flow rate and with low cost.

EXAMPLES

As can be appreciated from the disclosure provided above, the present disclosure has a wide variety of applications. Accordingly, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Those of skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

Example 1

Figure 4:
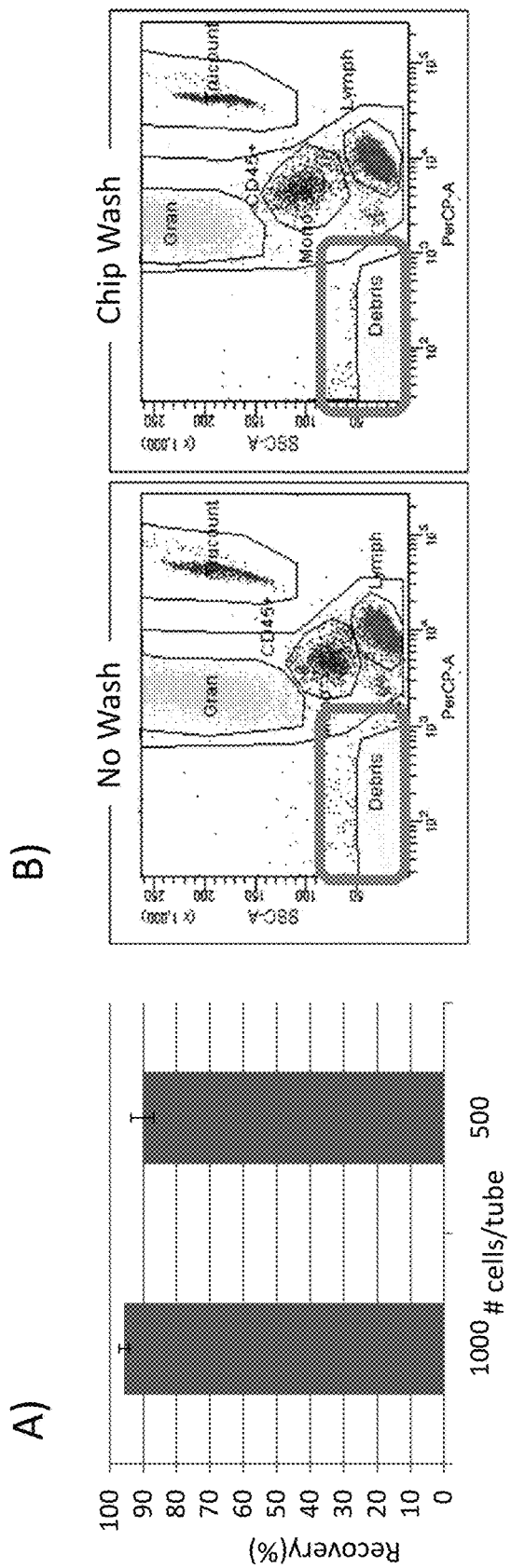
FIG. 4, panels A-C depict the analysis of biological sample assay compositions according to certain embodiments of the present disclosure.
Figure 4:
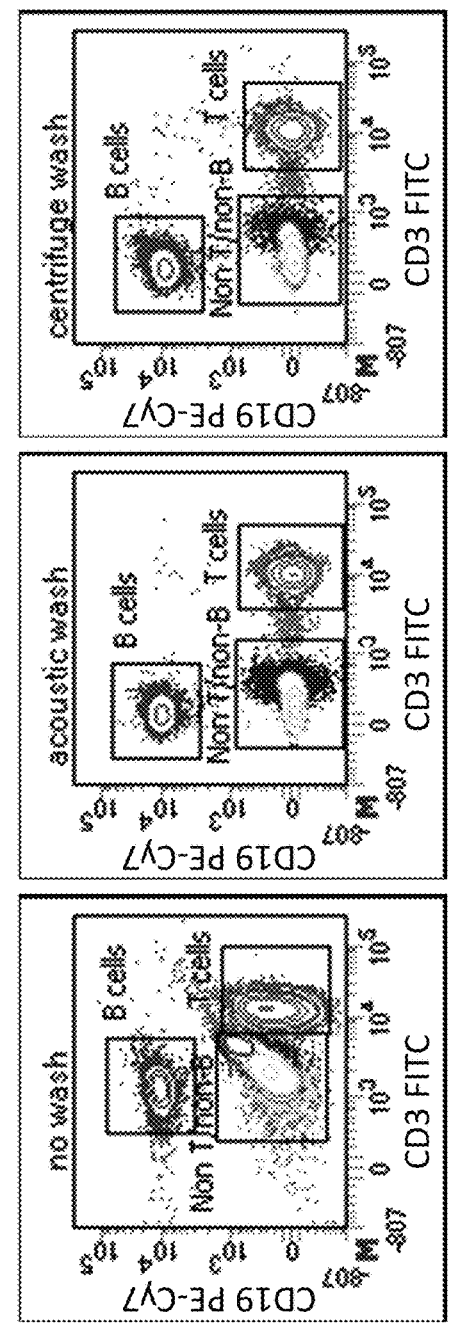

FIGS. 4A-C depict the analysis of biological sample assay compositions according to certain embodiments of the present disclosure. FIG. 4A depicts a graph of cell recovery of biological samples having low cell numbers. As shown in FIG. 4A, with biological samples having 1000 cells or less, the number of cells processed and analyzed by the subject methods is 90% or greater. In the first example, a biological sample assay composition having 1000 cells is inputted into the subject flow cytometer and cell sorting by the flow cytometer reveals that 95% of the cells are recovered after processing by the acoustic separator and subsequent analysis. In the second example, a biological sample assay composition having 500 cells is inputted into the subject flow cytometer and cell sorting by the flow cytometer reveals that 90% of the cells are recovered after processing by the acoustic separator and subsequent analysis. FIG. 4B depicts a two dimensional plot comparing a biological sample assay composition analyzed by a conventional flow cytometer and the same biological sample assay composition with a flow cytometer as provided by the present disclosure. As shown in FIG. 4B, the biological sample assay composition analyzed by the conventional flow cytometer exhibits a significant amount of debris and extraneous components while analysis with the subject flow cytometer provides a two dimensional plot with little to no debris. FIG. 4C illustrates the analysis of a biological sample assay composition by flow cytometry with the subject systems (panel 2) as compared to analysis by flow cytometry without processing the biological sample assay composition (panel 1) and as compared to analysis by flow cytometry after traditional wash and centrifugation methods (panel 3). The biological sample assay composition analyzed without processing (i.e., with washing sample after contacting with the assay reagent) exhibits a significant amount of excess assay reagent and staining buffer not present in the plot of the analysis of a biological sample assay composition by flow cytometry with the subject systems. In addition, the analysis of a biological sample assay composition by flow cytometry with the subject systems shows greater cell recovery than analysis of the biological sample assay composition by flow cytometry after traditional wash and centrifugation methods (comparing panel 2 vs. panel 3).

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

The invention claimed is:
1. A method comprising:
contacting a biological sample derived from a tumor comprising cells, cellular debris, tissue matter, cell aggregates and non-cellular components comprising connective tissue, free lipids, proteins and nucleic acid fragments with an amount of assay reagent comprising one or more analyte-specific binding members to produce a biological sample assay composition comprising cells labelled with an analyte-specific binding member and excess assay reagent;
introducing the biological sample assay composition into an inlet of a flow channel of an acoustic separator that is integrated into a flow cytometer, wherein the biological sample assay composition is introduced directly following preparation into the flow cytometer without intervening steps and wherein the integrated acoustic separator comprises:
a flow channel comprising an inlet and an outlet and walls that extend from the inlet to the outlet; and
an acoustic field generator positioned adjacent to the flow channel and configured to produce an acoustic field in the flow channel;

conveying the biological sample assay composition along the walls of the flow channel of the acoustic separator with a laminating wash buffer flowing therebetween; and applying an acoustic standing wave in the flow channel in a manner sufficient to move one or more of the cellular debris, tissue matter, cell aggregates, non-cellular components and excess assay reagent from the biological sample assay composition flowing along the walls of the flow channel into the laminating wash buffer flowing therebetween, thereby producing a waste fluid.

2. The method according to claim 1, wherein the method further comprises monitoring the waste fluid with a detector positioned at the outlet of the flow channel.

3. The method according to claim 1, wherein the biological sample has a volume of 50 µl or less.

4. The method according to claim 1, wherein the biological sample is selected from the group consisting of a fine needle aspirate, tissue biopsy, pediatric sample, nasal lavage, bronchial lavage, pleural lavage and a lysed blood sample.

5. The method according to claim 4, wherein the biological sample is a fine needle aspirate.

6. The method according to claim 1, wherein the method further comprises detecting cells of the biological sample composition at the outlet of the acoustic separator.

7. The method according to claim 6, wherein detecting comprises detecting light scatter from the cells of the biological sample composition.

8. The method according to claim 6, wherein detecting comprises detecting fluorescence from the cells of the biological sample composition at the outlet of the acoustic separator.

9. The method according to claim 1, further comprising determining the makeup of the biological sample composition.

10. The method according to claim 9, wherein determining the makeup of the biological sample composition comprises counting the number of each type of cell in the biological sample composition.

11. The method according to claim 9, further comprising adjusting one or more parameters of the acoustic separator in response to the determined makeup of the biological sample composition.

12. The method according to claim 11, wherein the method comprises adjusting the flow rate of the biological sample composition through the acoustic separator in response to the determined makeup of the biological sample composition.

13. The method according to claim 11, wherein the method comprises adjusting the acoustic field strength in the acoustic separator in response to the determined makeup of the biological sample composition.

14. The method according to claim 1, wherein the analyte-specific binding member is an antibody or antibody fragment.

15. The method according to claim 14, wherein the antibody or antibody fragment specifically binds to a target selected from CD14, CD4, CD45RA, CD3 or a combination thereof.

16. The method according to claim 1, wherein contacting the biological sample with the assay reagent comprises labeling one or more cells in the biological sample composition with a detectable label.

17. The method according to claim 16, wherein the detectable label is an optically detectable label.

18. The method according to claim 17, wherein the optically detectable label comprises a fluorescent dye.

19. The method according to claim 1, wherein laminating wash buffer has a greater density than the biological sample assay composition.

20. The method according to claim 19, wherein the laminating wash buffer has a density that is 5% or greater than the biological assay composition.

21. The method according to claim 1, wherein the acoustic standing wave is applied in a manner sufficient to move one or more non-cellular components from the biological sample assay composition into the laminating wash buffer based on the size of the non-cellular components.

22. The method according to claim 1, wherein the assay reagent is dry.

23. The method according to claim 1, wherein the method further comprises re-directing the biological sample assay composition through the acoustic separator for one or more additional washing intervals.

* * * * *